United States Patent [19]

Hobbs, II

[11] 4,048,981
[45] Sept. 20, 1977

[54] SOLAR HEATER

[76] Inventor: James C. Hobbs, II, 4384 Ingraham Highway, Miami, Fla. 33133

[21] Appl. No.: 541,417

[22] Filed: Jan. 16, 1975

[51] Int. Cl.² ............................................. F24J 3/02
[52] U.S. Cl. ................................... 126/271; 237/1 A
[58] Field of Search ................ 126/270, 271; 237/1 A

[56] References Cited

U.S. PATENT DOCUMENTS

| 995,219 | 6/1911 | Bradley | 126/271 |
| 1,014,972 | 1/1912 | Nichols | 126/271 |
| 1,888,620 | 11/1932 | Clark | 126/271 |
| 2,358,476 | 9/1944 | Routh et al. | 126/271 |
| 2,660,863 | 12/1953 | Gerhart, Jr. | 126/271 |
| 3,076,450 | 2/1963 | Gough et al. | 126/271 |
| 3,107,052 | 10/1963 | Garrison | 126/271 |
| 3,250,269 | 5/1966 | Sherock | 126/271 |
| 3,390,672 | 7/1968 | Snelling | 126/271 |

Primary Examiner—Kenneth W. Sprague
Assistant Examiner—James C. Yeung
Attorney, Agent, or Firm—Watts, Hoffmann, Fisher & Heinke Co.

[57] ABSTRACT

The apparatus to absorb solar radiant energy including means to circulate an energy absorbing liquid through a shallow passageway between two substantially flat members while maintaining the static pressure of the liquid not greater than atmospheric pressure.

13 Claims, 7 Drawing Figures

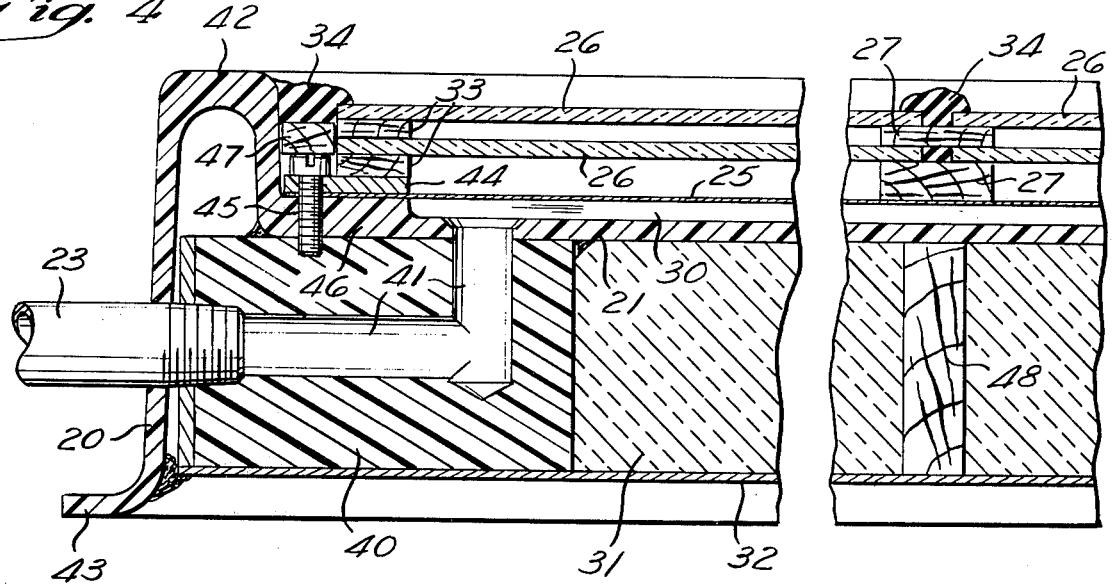
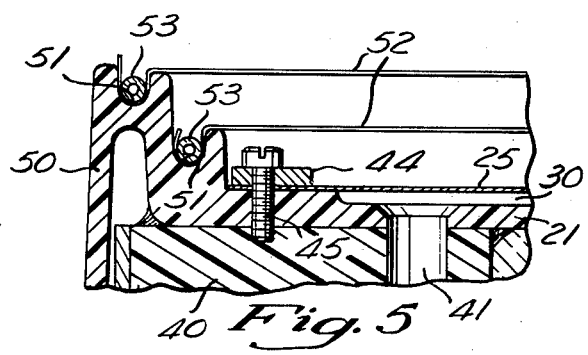
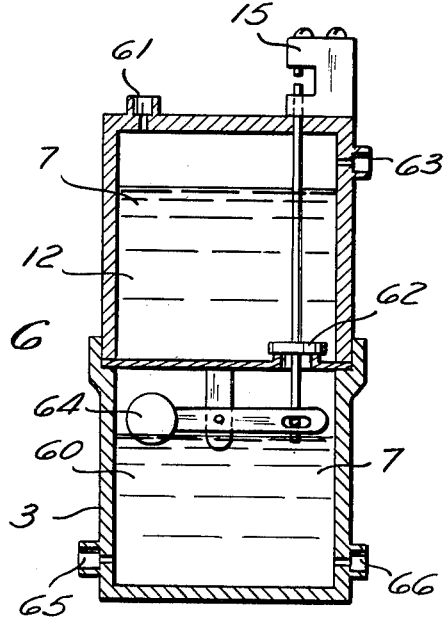
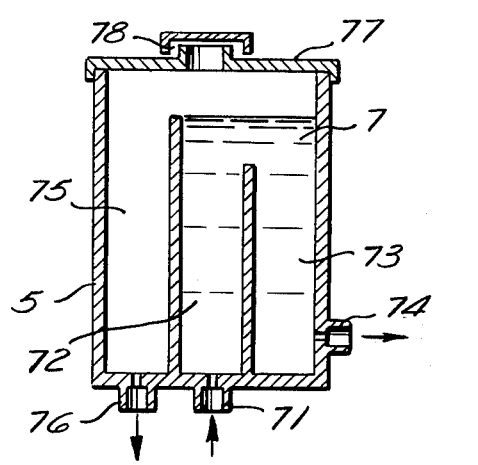

SOLAR HEATER

BACKGROUND OF THE INVENTION

So far as I know, all prior apparatus for heating a liquid by solar energy has been operated with the heat absorbing liquid at or above atmospheric pressure.

SUMMARY OF THE INVENTION

The solar heater apparatus of the present invention includes a heat absorber made up of a bed member and a top member positioned and held in a closely spaced relative position so as to form a shallow elongated space between those two members. In a preferred form the bed is provided with elongated ribs projected therefrom to act both as spacer-supports for the top and also as side walls for an elongated passageway from an inlet to a remote outlet.

The heat absorbing liquid flowing through the passageway is maintained at a static pressure not above atmospheric pressure. The pressure in the passageway is maintained by having the inlet open to atmospheric pressure and the outlet connected to the inlet or suction side of a small circulating pump.

By maintaining the pressure between the members at not above atmospheric pressure, it is possible to use light weight and inexpensive construction without any need for the usual reinforcing structure required to confine the pressures present in previous heat absorbing units. The top is exposed to solar radiant energy and may be made of a thin material. The top is pressed against and supported by the top edges of ribs on the bed. The exposed surface of the top is a dark color for maximum heat absorption and a minimum thickness for increased heat transfer to the liquid in contact with the inner surface. The top has substantially all of its under surface in contact with the liquid to eliminate the need for transverse heat flow edgewise through the top.

The other parts of the apparatus are easily and inexpensively made for a low cost and efficient absorption apparatus. In its simplest form the invention may be realized with only a heat absorber and a small pump. It is preferred to realize the benefits of the invention with a few control means for automatic operation.

BRIEF DESCRIPTION OF THE DRAWINGS

The invention will be more clearly understood by reference to the drawings in which:

FIG. 4 is a partial sectional view of a connection to the absorber of FIG. 2;

FIG. 5 is a sectional view of an alternate construction to that shown in FIG. 4;

FIG. 6 is a sectional view of the reservoir tank; and

FIG. 7 is a sectional view of the surge tank.

Figure 1:
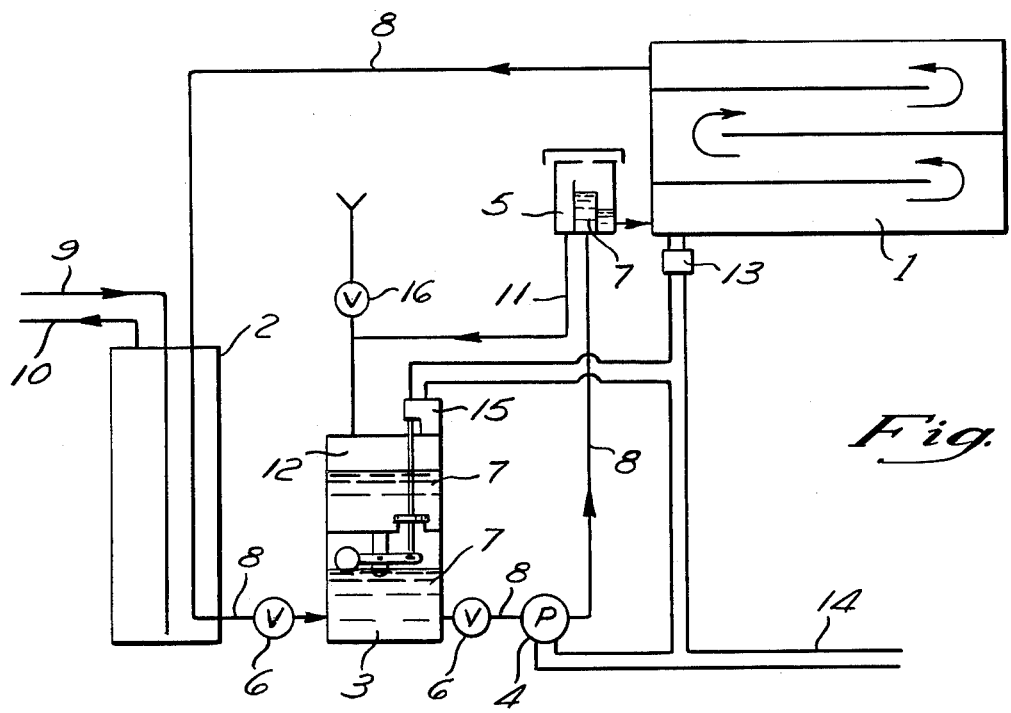
FIG. 1 is a schematic plan of the apparatus of the present invention.

The apparatus shown schematically in FIG. 1 includes absorber 1 connected by suitable piping to a heat exchanger 2 which is connected to reservoir 3. From a low point of reservoir 3 a pipe is connected to the inlet or suction of pump 4 which discharges into surge tank 5 which is vented to the atmosphere. Suitable check valves 6 are placed in the connecting pipes between heat exchanger 2 and reservoir 3 and between reservoir 3 and pump 4 to prevent reverse flow of liquid when the pump is not operating.

A supply of circulating heat absorbing liquid 7 is provided in reservoir 3 in addition to the amount of liquid necessary to fill the system. Absorbing liquid 7 is preferably a liquid mixture with a low freezing temperature. Overflow pipe 11 leads from surge tank 5 to a reserve supply of liquid stored in the upper chamber 12 of reservoir 3.

When used to heat water, a cold water supply 9 is connected to heat exchanger 2 in which the circulating liquid is cooled and the water is heated before leaving the exchanger. The hot water outlet 10 of exchanger 2 may be connected either to a conventional auxiliary heater or directly into a hot water system. If desired, the liquid may be used to heat circulated air in a suitable exchanger.

Thermostat 13 is located near absorber 1 and is a part of pump motor control circuit 14. Thermostat 13 is set to close when a preselected high temperature is present at the absorber. Also included in control circuit 14 is a low level cut out switch 15 to prevent pump operation with an insufficient supply of liquid.

Figure 2:
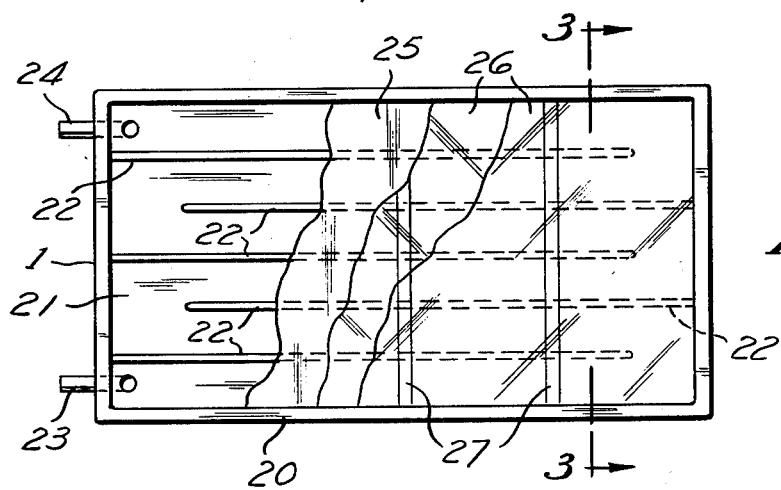
FIG. 2 is a general arrangement plan view of the absorber.

As shown in the general arrangement plan view of FIG. 2, frame 20 of absorber 1 is large enough to provide an adequate heat absorbing area. I have found a frame 4 feet by 8 feet in size to be a practical size for manufacturing and installation at the desired inclination to be normal to the sun's rays. The construction of absorber 1 is adaptable to either larger or smaller areas as desired or, if required, multiple absorbers may be connected either in series or in parallel.

In the preferred form, frame 20 is molded of a suitable material, such as fiber glass, to have a one piece structure including a bed portion 21 without joints. Molded into bed portion 21 are ribs 22 so positioned to give an extended and reversing or serpentine passageway from the lower or inlet connection 23 to the upper or outlet connection 24. The height of ribs 22 will determine the thickness or depth of the liquid stream as it flows over bed 21 and under top 25. The upper edges of the ribs have substantially only line contact with the under surface of top 25 so as to give maximum heat transfer area in contact with liquid 7 of the radiant energy falling on top 25.

The depth of the flowing liquid should be small enough to get maximum heat absorption and large enough to minimize the flow resistance. A depth of one eighth inch to one quarter inch has been found to be satisfactory. As used herein the term thin refers to this range of depth.

As an alternate construction to having the ribs on bed 21 it is possible to stamp ribs into top 25 having the desired form and location to contact a substantially flat bed. This alternate construction would provide total area contact for heat transfer between the underside of top 25 and liquid 7.

Connections 23 and 24 are preferably on the same end of frame 20 in order to have either a right hand arrangement as shown or a left hand arrangement with both connections at the opposite end. Frame 20 and the arrangement of ribs 22 provides the same flow path and flow characteristics in either arrangement.

Transparent shields 26 are usually made of glass and may be arranged to provide a single layer shield or a double layer shield as shown. The shields allow radiant energy to pass into the dead air spaces above top 25 where the temperature increases and the heat is trapped to keep top 25 at a high temperature. Supports 27 extend across frame 20 between top 25 and shields 26.

Figure 3:
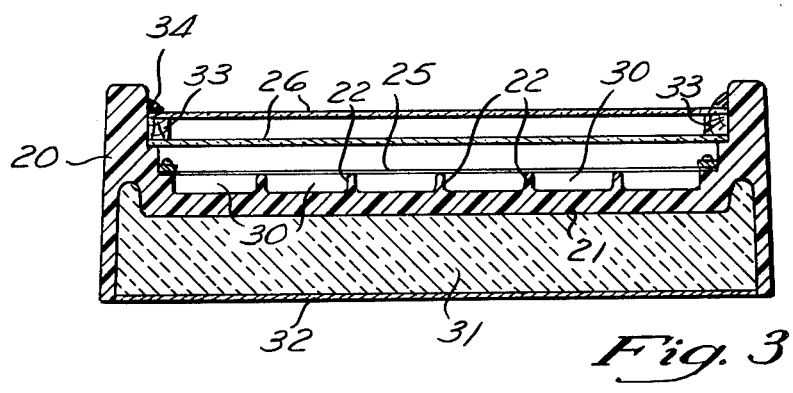
FIG. 3 is a larger scale cross sectional view of the absorber of FIG. 2.

The absorber of FIG. 3 has a double layer of shields 26 positioned above top 25. Liquid passageways 30 are shown in cross section with a low ratio of depth to width for the flowing stream. Insulation 31 under bed 21 prevents heat loss through the bed. Bottom 32 may be a thin sheet of material to contain insulation 31. Strip spacers 33 position shields 26. The exposed joints of shields 26 and supports 27 are sealed with suitable caulking 34.

Section view, FIG. 4, shows connection 23 entering frame 20 and connecting through block 40 and through holes 41 to passageway 30. Block 40 is cemented to the under surface of bed 21. Frame 20 is formed with an outer edge 42 surrounding bed 21 to give the necessary rigidity to the entire assembly. Frame 20 includes mounting flange 43 for securing the absorber to a supporting structure. Top 25 rests on frame 20 and its periphery is secured to and sealed to frame 20 as by strip clamps 44 held in position by screws 45. A suitable cement means may be used between top 25 and support ledge 46 for fluid tight sealing. Top 25 should be thin enough to have maximum heat transfer and thick enough to resist bending in either direction under differences in pressure. Filler strip 47 prevents caulking 34 from covering screws 45. Joist 48 is positioned under bed 21 and connected at each end to frame 20 for added strength.

An alternate and less expensive construction for shields 26 is shown in FIG. 5. Frame 50 is provided with either one or two grooves 51 of suitable size and depth to allow transparent sheet 52 to be stretched across frame 50 and held in place by friction tube 53. For an even lower cost absorber it is possible to eliminate friction tube 53 and cement sheet 52 directly to frame 50.

Reservoir 3 as shown in FIG. 6 includes upper chamber 12 and lower chamber 60. Overflow inlet 61 from surge tank 5 may also be used to fill the system through valve 16. Upper chamber 12 is connected to lower chamber 60 through float valve 62. In the event of an excess of liquid 7 in chamber 12 spillover 63 will limit the amount of reserve liquid in storage. In normal operation float valve 62 is closed and lower chamber 60 is at a pressure below atmospheric pressure. In the event the liquid level in lower chamber 60 should drop, float valve 62, actuated by float means 64, will open and at the same time switch 15 will open and stop the pump. When the liquid level rises sufficiently in chamber 60, valve 62 will close and switch 15 will close to restart the pump. Connections 65 and 66 are for connecting piping to heat exchanger 2 and pump 4.

Surge tank 5 of FIG. 7 is mounted adjacent to the inlet of absorber 1. Circulating heat absorbing liquid is pumped into tank 5 through inlet 71 to fill center chamber 72. Adjacent to chamber 72 is supply chamber 73 connected to absorber 1 through outlet 74. Liquid 7 pumped into tank 5 first fills center chamber 72 and overflows into supply chamber 73 to maintain an adequate supply at the inlet of absorber 1. Any excess liquid will overflow into drain chamber 75 and return to upper chamber 12 of reservoir 3. Tank cover 77 is provided with a vent 78 to the atmosphere to maintain atmospheric pressure at the inlet connection to the absorber.

The apparatus will give satisfactory results without the inclusion of reservoir 3 when a self-priming pump is used and the liquid level in surge tank 5 is manually monitored.

From the above description it can be understood that whenever pump 4 is running there is a suction of liquid through absorber 1. The less than atmospheric pressure in passageways 30 will pull top 25 into contact with ribs 22 without additional supporting structure. I have observed that under operating conditions in which the temperature of top 25 rises above normal operating temperature the top will expand away from ribs 22 and permit an increase in liquid flow through absorber 1 until normal temperature is restored.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A system utilizing solar energy for heating purposes comprising:
    a. a heat absorber to be exposed to sunlight and through which heat exchange liquid can flow, said absorber having an inlet for said liquid at one elevation and an outlet for said liquid at a higher elevation;
    b. a liquid supply for the absorber, open to the atmosphere and communicating with the absorber inlet, said supply being at an elevation no higher than the elevation of the heat absorber inlet; and
    c. a pump having an inlet operatively connected to the absorber outlet;
    d. whereby liquid will be drawn through the absorber by the pump and be introduced to the absorber from the supply at no greater than atmospheric pressure.

2. A system as described in claim 1 including means communicating between an outlet of said pump and said supply for circulating said heat exchange liquid.

3. A system utilizing solar energy for heating purposes comprising:
    a. a heat absorber to be exposed to sunlight having an inlet at one elevation and an outlet at a higher elevation;
    b. a vessel having an opening to the atmosphere, an inlet, and an outlet through which liquid is supplied to the absorber inlet, said vessel being locatad no higher than the elevation of the heat absorber inlet;
    c. a pump having an inlet operatively connected to the absorber outlet; and
    d. means to supply liquid to be heated to the vessel inlet,
    e. whereby liquid will be drawn through the absorber by the pump and be supplied to the absorber from the vessel at no greater than atmospheric pressure.

4. A system utilizing solar energy for heating purposes comprising:
    a. a heat absorber to be exposed to sunlight having an inlet at one elevation and an outlet at a higher elevation;
    b. a liquid supply for the absorber open to the atmosphere and communicating with the absorber inlet;
    c. means limiting the elevation of said supply to no higher than the elevation of said inlet;

d. a pump having an inlet operatively connected to the absorber outlet; and e. means to replenish said supply;

f. whereby liquid will be drawn through the absorber by the pump and be introduced to the absorber from the supply at no greater than atmospheric pressure.

5. A system utilizing solar energy for heating purposes comprising:

a. a heat absorber to be exposed to sunlight having an inlet at one elevation and an outlet at a higher elevation;

b. heat exchange liquid within the absorber at a static pressure no greater than atmospheric;

c. a supply of heat exchange liquid for the absorber open to the atmosphere and communicating with the absorber inlet;

d. a pump having an inlet operatively connected to the absorber outlet to cause liquid to flow through the absorber; and e. means to maintain said supply by recirculating the liquid.

6. A system as described in claim 5 that includes a heat exchanger downstream from the outlet of the absorber in which liquid flowing through the system loses heat to a second fluid.

7. A system as described in claim 5 that includes a check valve downstream from the absorber outlet and upstream of the pump.

8. A system as described in claim 5 wherein the heat absorber includes two parts in opposed relationship having abutting portions that define a path for liquid between the two and wherein at least some of the abutting portions are mechanically free to separate and are urged into mutual contact by atmospheric pressure when liquid is drawn through the absorber.

9. A system for heating liquid by solar energy comprising:

a. an absorber to be exposed to sunlight having a bed portion with ribs on an upper surface, a cover on said bed portion to define a liquid passageway therebetween, an inlet to said passageway at one elevation and an outlet from said passageway at a higher elevation; and b. means to establish a flow of liquid through the absorber at a static pressure no greater than atmospheric, said means including:

i. a vessel having an opening to the atmosphere, an inlet for receiving a supply of liquid, and an outlet connected to said passageway inlet; and ii. a pump having an inlet operatively connected to said passageway outlet to draw liquid from said vessel through said absorber and to discharge the liquid through an outlet.

10. A system as set forth in claim 9 wherein said vessel inlet is connected to receive liquid discharged from the pump outlet, and including a heat exchanger between said passageway outlet and said vessel inlet.

11. A system as set forth in claim 9 wherein said absorber includes a frame member having an outer edge surrounding said bed portion, said cover on said bed portion has an outer surface exposed to atmospheric pressure and extends over a part of and is in fluid tight engagement with said outer edge and the ribs on said bed portion have upper edges that abut but are not secured to the cover along substantially line contacts to form the passageway for fluid flow between said bed portion and said cover.

12. An absorber for heating liquid by solar energy comprising:

a. a frame member having a bed portion and an outer edge surrounding said bed portion;

b. a cover on said bed portion having an outer surface exposed to atmospheric pressure, and an inner surface opposed to said bed portion, extending over a part of and having a fluid tight engagement with said outer edge;

c. ribs on said bed portion having upper edges abutting but not secured to the inner surface of said cover along substantially line contacts to form an elongated passageway for fluid flow between said bed portion and said cover;

d. means maintaining liquid under subatmospheric pressure between the cover and bed portion; and e. an inlet and an outlet to said passageway, the inlet being at a lower elevation than the outlet.

13. An absorber for heating liquid by solar energy comprising:

a. a unitary fluid impervious frame member having a bed portion and an outer edge surrounding said bed portion;

b. a cover on said bed portion having an outer surface exposed to atmospheric pressure, an inner surface opposed to said bed portion, extending over a part of and having fluid tight engagement with said outer edge;

c. ribs on said bed portion having upper edges abutting but not secured to the inner surface of said cover along substantially line contacts to form an elongated passageway for fluid flow between said bed portion and said cover;

d. means maintaining liquid under subatmospheric pressure between the cover and bed portion;

e. air space above said cover defined by transparent means extending over said cover and sealed to said outer edge portions; and f. insulation within the frame member on the opposite side of said bed, isolated by said frame and bed portion from said air space.

* * * * *